United States Patent [19]
Deonarine et al.

[11] Patent Number: 5,697,489
[45] Date of Patent: Dec. 16, 1997

[54] LABEL PROCESSING MACHINE

[75] Inventors: Victor I. Deonarine, Macedonia; James W. Cone, Kent, both of Ohio

[73] Assignee: Illinois Tool Works, Inc., Glenview, Ill.

[21] Appl. No.: 538,098

[22] Filed: Oct. 2, 1995

[51] Int. Cl.$^6$ .................................................. B65G 43/00
[52] U.S. Cl. ............................ 198/464.4; 198/467.1; 198/480.1
[58] Field of Search ............................ 198/464.4, 467.1, 198/480.1, 502.1, 346.2

[56] References Cited

U.S. PATENT DOCUMENTS

| | | | |
|---|---|---|---|
| 1,069,870 | 8/1913 | Gaynor | 198/464.4 |
| 2,013,144 | 9/1935 | Gladfelter | 198/464.4 |
| 4,789,016 | 12/1988 | Mihail | 198/467.1 |

*Primary Examiner*—Joseph E. Valenza
*Attorney, Agent, or Firm*—Watts, Hoffmann, Fisher & Heinke Co., L.P.A.

[57] ABSTRACT

A machine for labeling or delabeling vessels is disclosed. The machine has a turret with a series of work stations and input and output transfer stations for supplying and removing vessels to and from the turret. Input and output star wheel assemblies are respectively positioned at the input and out stations. A supply conveyor is provided for transporting vessels to the input star wheel assembly. The supply conveyor includes a variable pitch feed screw opposite a pair of spring biased input guide rails. The input guide rails each have guide and a jam relief positions. An exit conveyor delineates an exit path of vessel travel downstream from the output star wheel assembly including an exit guide rail having an input end pivotally mounted at a location near the output star wheel assembly. The exit guide rail has a normal position adjacent the exit path and a jam relief position. Each star wheel assembly includes a drive normally drivingly connected to the star wheel to cause star wheel rotation and a clutch disabling the driving connection under overload conditions. Machine stop sensors are provided which sense guide rail movement and clutch disabling.

3 Claims, 5 Drawing Sheets

LABEL PROCESSING MACHINE

This invention relates to vessel processing machines and more particularly to machines for applying and removing tubular sleeve type plastic labels to or from bottles.

BACKGROUND OF THE INVENTION

Plastic vessel labels are now widely utilized to enhance product appearance and provide product information. Typically, the labels are printed polyethylene while a vessel, such as a soft drink beverage bottle, is typically a blow molded bottle of a material known as PET. While wrap around labels, the ends of which are adhesively bonded to a vessel, have been popular because they have enjoyed a cost advantage, the disadvantage of wrap around labels is that the bottle and label cannot be fully recycled. Complete recycling is not possible because there is no practical way to fully separate the adhesively bonded label material from the bottle.

Where recycling for reuse of the bottles is desired, and indeed in some jurisdictions mandatory, tubular sleeve labels which are telescoped over the vessels have been the solution. With the development of the high speed labeling machine described and claimed in U.S. Pat. No. 5,433,057 issued on Jul. 18, 1995 and the patent resulting from its parent application Ser. No. 07/789,257 filed Nov. 6, 1990 each under the title High Speed Sleever, (the Sleever Patents), tubular labels have enjoyed increasing success both because of full recyclability of the vessels and their labels, but also because they have become fully cost competitive with wrap around labels.

The popularity of tubular sleeve labels has been further enhanced by the development of high speed delabeling machines of the type described and claimed in U.S. Pat. No. 5,317,794 issued Jun. 7, 1994, and entitled Method of Delabeling, (the Delabeler Patent). With the machine of the Delabeler Patent labels are quickly and fully removed from bottles without marking or marring the bottles, thus facilitating recycling of the labels and, at the option of the user, recycling or reuse of the bottles.

The labeling and delabeling machines each utilize rotary turrets with multiple work stations where the labeling and delabeling operations are performed. With both types of machines supply and exit conveyors deliver bottles to and remove bottles from associated turrets. Each such machine utilizes star wheel transfers to transfer bottles from a supply conveyor to an associated turret and to transfer processed bottles from the turret to an exit conveyor. Both machines also utilize guide rails for retaining the bottles in aligned fashion along the conveyors.

A problem that has existed is that if a jam occurs with one such machine, considerable damage to bottles being processed and to the machine itself can occur.

SUMMARY OF THE INVENTION

The present invention is directed to mechanisms which are effective to minimize machine and vessel damage in the event of the occurrence of a jam and to sense jam conditions and thereupon emit machine stop signals. A machine of the present invention includes an input conveyor with a variable pitch feed screw aligned with it. The variable pitch screw provides appropriate spacing between successive bottles for registration with a transfer star wheel at a turret supply station.

Bottles being delivered to the turret are maintained in alignment and engagement with the variable pitch screw by a pair of spring biased guide rafts that engage surfaces of the conveyed bottles opposite the variable pitch screw. In the event of an obstruction to the feeding of vessels along the supply conveyor, pressure of the feed screw against vessels being transported cams the bottles out of feed recesses of the supply screw and moves them out of their paths of travel. Pressure from bottles so moved shifts the guide rails to jam relief positions against the respective guide raft biases.

An exit guide rail along the exit conveyor is pivotally mounted near its end proximal the turret. The exit guide rail is spring biased into its normal bottle guiding position. In the event of an impediment to exit transport of bottles from the turret along the exit conveyor, continuing feed pressure of further bottles is relieved by the pivotal side rail rotating about its pivot axis and against its spring bias to allow bottles to be fed off the exit conveyor.

When there is an impediment to bottle feed through either the input or exit star wheel, star wheel feed is interrupted. The interruption of feed by a star wheel is accomplished through an overload clutch which shifts the star wheel out of driving connection to its drive such that the star wheel no longer applies feed forces to bottles.

Whenever one of the guide rails is moved out of its normal guide position against the associated biasing action or an overrunning star wheel clutch disables a star wheel drive, an appropriate one of a set of sensors is actuated to send a machine stop signal which brings all machine motion to an end.

Accordingly, the objects of the invention are to provide a novel and improved label processing machine including means to minimize damage caused by a vessel feed obstruction.

IN THE DRAWINGS

FIG. 3 is a top plan view of the exit star wheel assembly of FIG. 1 on an enlarged scale with respect to FIG. 1;

DESCRIPTION OF THE PREFERRED EMBODIMENT

Figure 1:
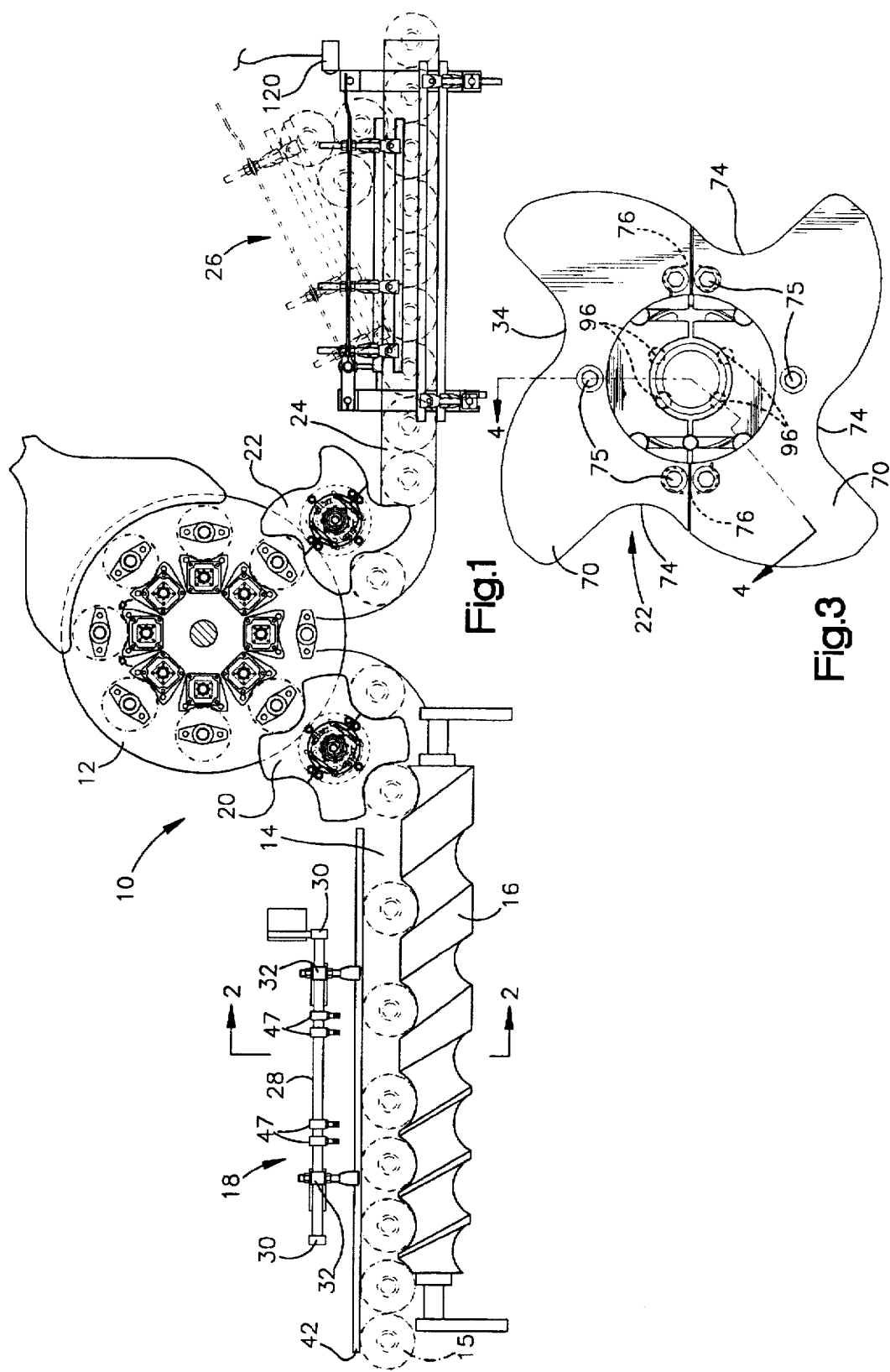
FIG. 1 is a somewhat schematic plan view of a vessel processing system including supply and exit conveyors and a vessel processing turret.

Referring to the drawings, and to FIG. 1 in particular, a vessel processing machine is shown generally at 10. The machine 10 includes a turret 12 which may be the turret of either the Sleever Patents or the Delabeler Patent. The pictured turret is that of the Delabeler Patent.

A supply conveyor 14 is provided. A plurality of vessels 15 to be processed are supplied to the conveyor in juxtaposed, in-line relationship. A variable pitch lead screw 16 is positioned adjacent the conveyor and synchronized with the turret to bring the bottles 15 into suitably spaced relationship for synchronized transfer to the turret. A star wheel mechanism 20 is provided for transfer of vessels at a transfer station from the conveyor 14 onto the turret 12.

An exit star wheel mechanism 22 is provided for transfer of processed vessels from the turret 12 at an exit station. The transfer at the exit station is onto an exit conveyor 24 which transfers the processed vessels downstream for further processing.

The machine as thus far described is now conventional. The present machine however differs from the prior machine in having mechanisms for interrupting the operation of the machine and minimizing damage to the machine and vessels being processed in the event of a jam. To this end, the output conveyor 24 is equipped with a novel output guide rail assembly 26, which like the input guide rail assembly 18, is designed to alleviate jam conditions and signal a machine shutdown.

The Input Guide Rail Assembly 18

The guide rail assembly 18 includes a stationary support shaft 28 carried by spaced end support brackets 30. Spaced pairs of upper and lower guide rail support brackets 32, 34 are journaled on the shaft 28 by bearings 35. The upper and lower brackets 32, 34 respectively include elongated guide slots 36, 38. Upper and lower rail supports 39, 40 are adjustably mounted on the brackets 32, 34 respectively. The adjustable mounting is accomplished by fasteners 41 which project through the supports 39, 40 and the slots 36, 38. The fasteners 41 accommodate guide rail height adjustments through vertical movement in the slots 36, 38.

Upper and lower elongate guide rails 42, 44 are carried by the rail supports 39, 40. As shown in FIG. 1 the guide rails 42 extend along a side of the conveyor 14 opposite the feed screw 16. The guide rails extend from a location upstream from the feed screw 16 to a location closely spaced from the input star wheel 20.

Figure 2:
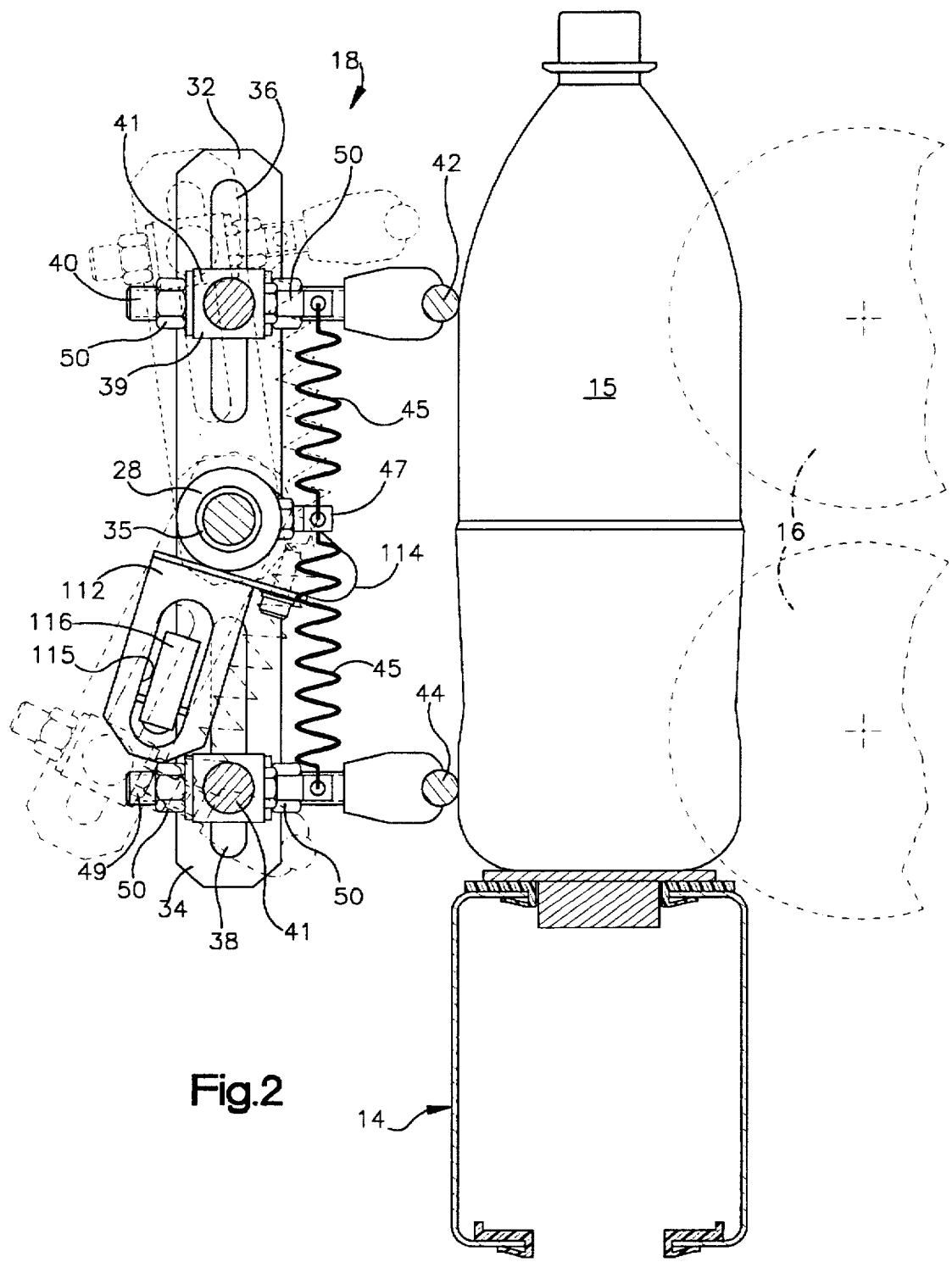
FIG. 2 is a sectional view of the input conveyor of the machine of FIG. 1 as seen from the plane indicated by the line 2—2 of FIG. 1 and on an enlarged scale.

As can be seen in FIG. 2, there are in fact two lead screws 16 and the guide rails 42, 44 engage the bottles 15 and bias them toward and against the guide screws. The rails 42, 44 are biased against the bottles 15 by the action of springs 45 which extend from spring anchors 47 to the rail supports 39, 40. The spring anchors 47 are fixed to the support shaft 28. As indicated by the phantom lines in FIG. 2, the guide rails 42, 44 together with their associated connected parts forming upper and lower guide rail subassemblies are respectively rotatable about the support shaft 28 from the positions shown in solid lines in FIG. 2, to the positions shown in phantom lines.

In order to accommodate bottles of varying dimensions, each of the guide rail supports 39, 40 includes a threaded element 49 and lock nuts 50. Manipulation of the lock nuts 50 enables axially shifting of the threaded elements 49 to move the guide rails toward and away from the variable pitch screws 16.

The Exit Guide Rail 26

Figure 5:
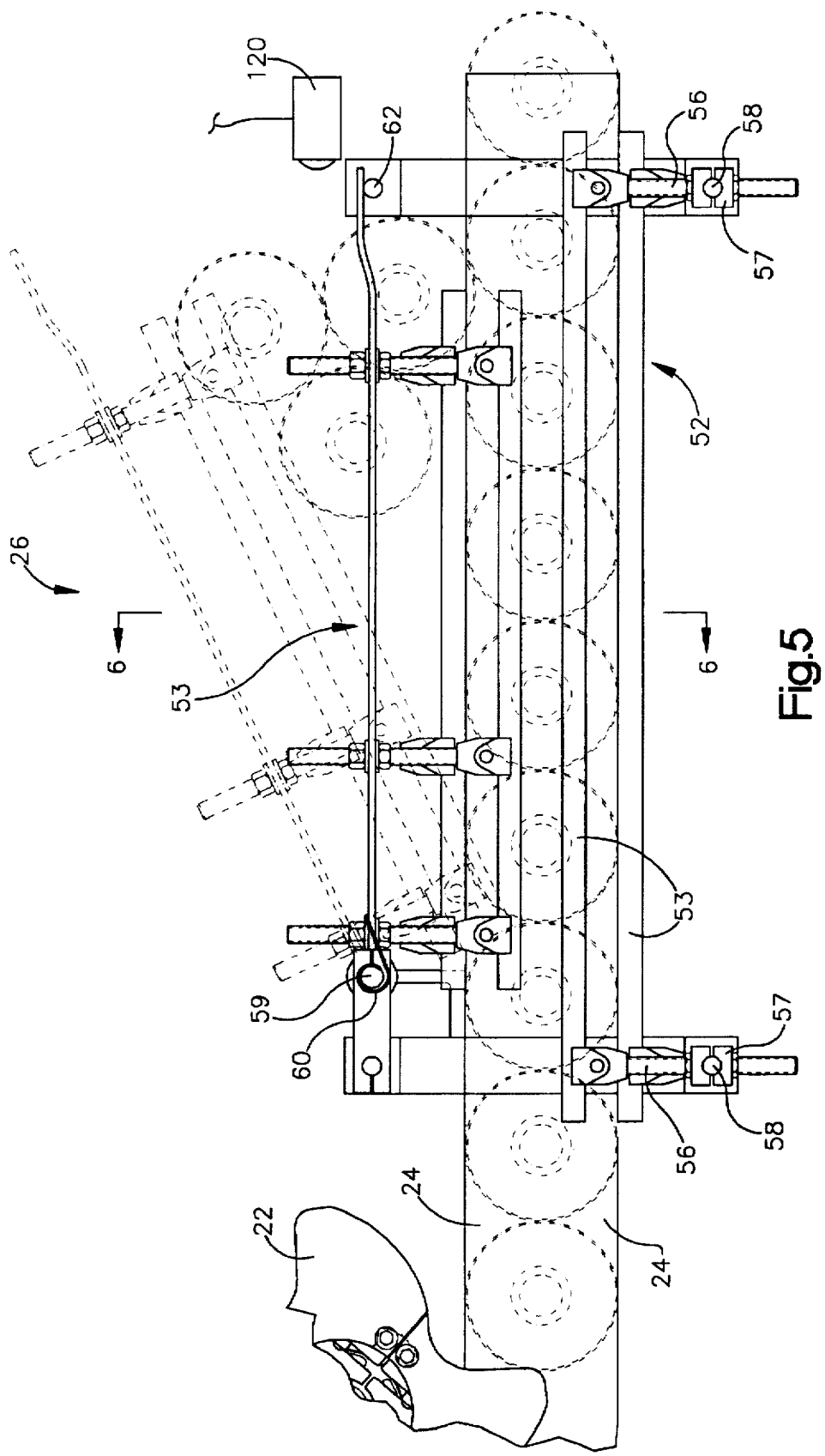
FIG. 5 is a plan view of the exit conveyor of the machine of FIG. 1 on an enlarged scale with respect to FIG. 1; and, FIG. 6 is a sectional view of the exit guide rail assembly and exit conveyor as seen from the plane indicated by the line 6—6 of FIG. 5.
Figure 6:
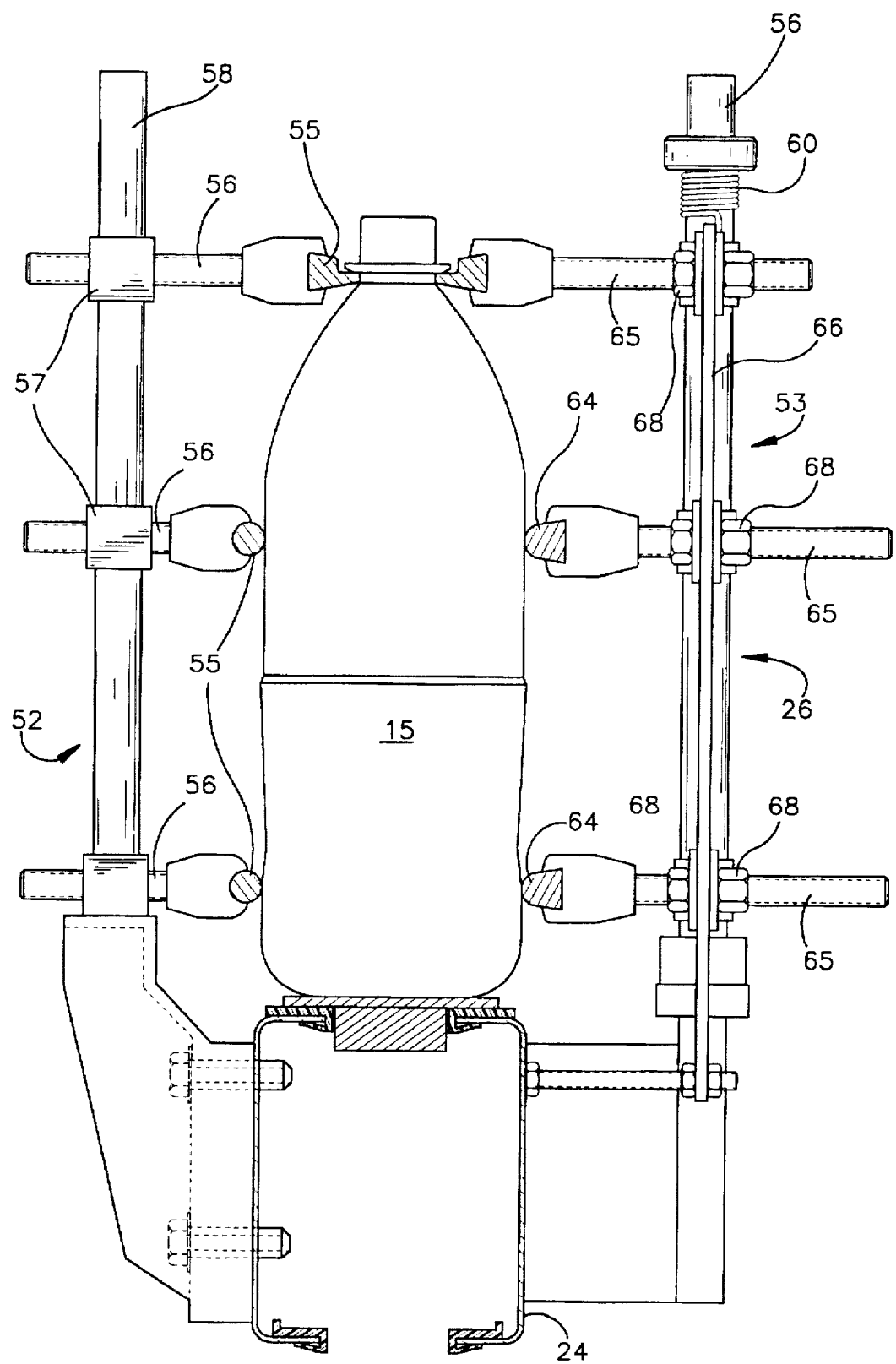

Referring now to FIGS. 5 and 6, the exit guide rail assembly 26 includes fixed and pivotal subassemblies 52, 53 respectively. The fixed subassembly 52 includes vertically spaced guide rails 55. Each of the guide rails 55 is carried by an adjustably mounted rail support 56. Each of the rail supports 56 includes a clamp 57 for clamping its guide rails at a selected vertical height on a support rod 58. The rail supports 56 are also axially adjustable in a manner corresponding to the adjustment of the input guide rail supports 39, 40.

The pivotal subassembly 53 is positioned on the side of the exit conveyor 24 opposite the fixed guide rail subassembly 52, so that exiting bottles 15 are guided between the two subassemblies. The pivotal guide rail assembly 53 is pivotally mounted on a shaft 59 and biased by a spring 60 rotatively about the shaft 59 and toward the conveyor 14. The spring 60 biases the pivotal subassembly 53 into engagement with a stop 62 near the end of the subassembly remote from the shaft 59.

The pivotal subassembly 53 includes guide rails 64 which in cooperation with the guide rails 55 maintain exiting bottles 15 along the exit conveyor 24 under normal operating conditions.

Each guide raft 64 is carried by a support 65 which supports are in turn mounted in a support member 66. The support member 66 has vertical slots to receive the supports 65 and allow, through coaction of lock nuts 68, both vertical adjustment and adjustment axially of the supports 65.

When an obstruction is encountered downstream, the pivotal subassembly 53 pivots against the biasing action of the spring 60, from its solid line position as shown in FIGS. 1 and 5 to its phantom position allowing bottles to escape as also indicated in phantom.

The Star Wheel Mechanism 20, 22

Figure 4:
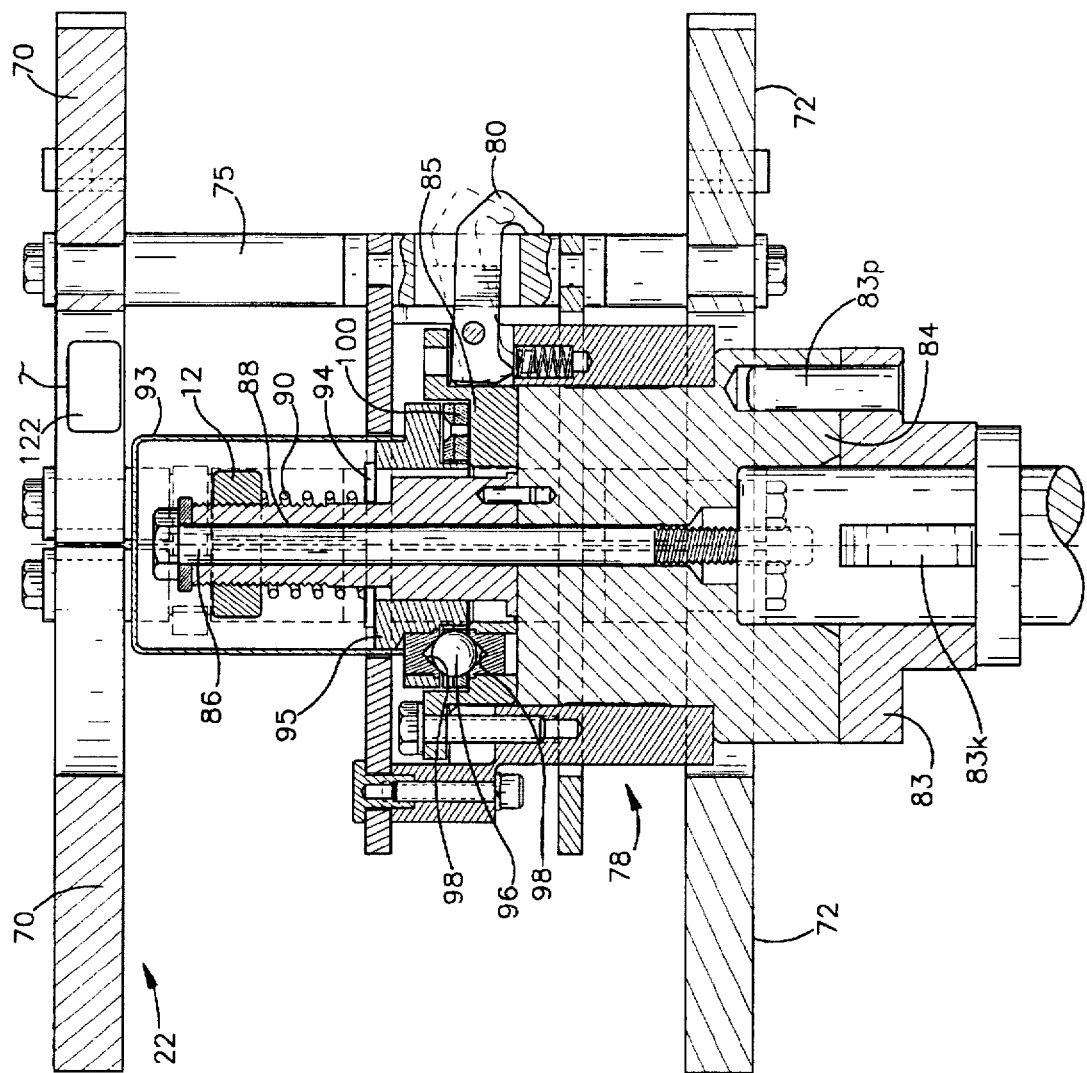
FIG. 4 is a sectional view of the exit star wheel assembly of FIG. 3 on an enlarged scale with respect to FIG. 3 and as seen from planes indicated by the lines 4—4 of FIG. 3.

In FIGS. 3 and 4, the star wheel mechanism 22 is shown in considerable detail. The mechanism 22 includes upper and lower split star wheel plates 70, 72. The plates 70, 72 each include four circumferentially spaced bottle engaging recesses 74. Apart from the perimetral configurations of the plates 70, 72 and of the bottle engagement recesses 74 in particular, the star wheel mechanisms 20, 22 are identical and accordingly only the star wheel 22 is described in detail.

The upper and lower plates 70, 72 are secured together in fixed relationship by spacer fasteners 75. It will be seen that the connected plates and spacer fasteners collectively form a star wheel assembly. The assembly is comprised of two identical subassemblies secured together by spring clips 76, FIG. 3. The star wheel assembly is connected to a star wheel drive assembly shown generally at 78 by a pair of hooks 80 only one of which is shown in FIG. 4.

Disengagement of the hooks 80 and the spring clips 76 enables facile removal of a given star wheel assembly for ready replacement by a star wheel assembly of a different size and configuration. The star wheel assemblies are removed and replaced when processing of bottles of one type is completed and process of bottles of another type is about to be undertaken, where the bottles of the two types are of different configuration or size.

The drive assembly 78 includes an input drive shaft 82 which, through a collar 83 and an intermediate element 84, is in fixed, constantly driving relationship with a lower element 85 of an overriding clutch. The collar 83 is interconnected to the shaft 82 by a key 83K. The collar in turn is in driving engagement with the intermediate element 84 through a pin 83P. An axially disposed through bolt 86 extends axially through a clutch control sleeve 88 and the intermediate element 84 and is threaded into the input drive shaft 82. The bolt 86 maintains the shaft 82 and the elements 84, 88 in juxtaposed, fixed relative positions.

A clutch biasing spring 90 surrounds the control sleeve 88. A spring tension nut 92 is threaded on the clutch control sleeve 88. The nut 92 acts against the spring 90 and is functional to adjust the compressive biasing force of the spring. A cup 93 covers and protects the spring 90 and the nut 92. The spring 90 acts against a spring washer 94 which in turn acts against an upper clutch element 95.

Referring to FIG. 3, four clutch balls 96 are provided. One of the clutch balls 96 is visible in FIG. 4. Each clutch ball is positioned, during normal drive operation, in an associated pair of recesses 98. One recess of each pair is in the lower clutch element 85 and the other recess of each pair is in the upper clutch element 95. The balls are carried in mating cages 100. As is seen in FIG. 3, the cages locate the balls 96 at varying radial distances and with non uniform circumferential spacing relative to the drive axis of the star wheel mechanism.

When each or both of the star wheel plates 70, 72 encounters a jam such that the torque required to continue rotation of the plates is excessive, the clutch elements act to disengage the driving connection between the drive shaft 82 and the plates 70, 72. Under these circumstances continued rotation of the lower clutch element 85 while the upper clutch element 95 is restrained from rotation causes the balls 96 to roll out of their associated recess pairs 98. This cams the upper clutch element 95 upwardly against the biasing action of the spring 90. Because the recesses and the balls are disposed in a non uniform circumferential relationship and at varying radial distances, there must be 360° of relative rotation before the balls, 96 are again aligned with their respective associated recess pairs. Since one entire revolution of the lower clutch element 85 is required before the clutch is reengaged, ample time is afforded to bring the entire machine to a stop before the clutch is reengaged.

The Machine Stop Sensors

Whenever the output guide rail assembly 26, the upper or lower guide rail 42 or 43 or one of the star wheels 20, 22, experiences a jam, the machine is brought to a halt. The stoppage of the machine is caused by one of a series of sensors which sense jam produced movement and, in response to such sensing, emit machine stop signals. The sensors are preferably proximity sensors each of which utilizes distortion of an electro magnetic field due to the "observed" presence of a paramagnetic material such as steel to emit a signal. Suitable detectors are manufactured by Haus Turck GmbH & Co. KG. of Witzlebenstrasse 7 45472 Mulheim/Ruhr, Germany (Model Bi-5-M18-VP4X-H1141).

Referring now to FIG. 2, a sensing mechanism for sensing input guide rail movement is shown. This mechanism includes a sensor bracket 112 which is fixed to the upper guide rail bracket 32 by fasteners 114, only one of which is shown in FIG. 2. The bracket 112 includes a sensor support slot 115. An input guide rail sensor 116 is adjustably mounted in the slot 115 and on the bracket 112. The sensor 116 is positioned such that when the upper and lower guide rails 42, 44 are in their normal position, it does not "see" the lower guide rail support 40. When either the upper or lower guide rail is shifted from its solid line position of FIG. 2 to its phantom line position, a sensor beam is broken by the lower guide raft support 40 and the sensor 116 emits a machine stop signal.

Referring to FIG. 5, an exit guide rail sensor 120 is shown. The exit guide rail sensor, like the input guide rail sensor 116, has a beam which is broken when the guide rail moves. In the case of the exit guide rail sensor 120 when positioned as shown schematically in FIGS. 1 and 5, the sensor is positioned so that it "sees" one of the supports 66 when the guide rail is moved out of its solid line position.

Referring now to FIG. 4, a star wheel sensor 122 is provided. A corresponding star wheel sensor is provided in association with the input star wheel mechanism 20, so again, because of identity of parts, only the exit star wheel mechanism is shown in detail. When the overriding clutch causes the upper clutch element 95 to rise, the cup 93 rises with it. When the cup 93 rises because the overrunning clutch has disengaged the drive between the upper and lower clutch elements 95, 85, the sensor 122 "sees" the cup and like the sensors 116, 120, issues a machine stop signal which brings the machine promptly to a stop.

Although the invention has been described in its preferred form with a certain degree of particularity, it is understood that the present disclosure of the preferred form has been made only by way of example and that numerous changes in the details of construction, operation and the combination and arrangement of parts may be resorted to without departing from the spirit and the scope of the invention as hereinafter claimed.

We claim:

1. A star wheel mechanism for use in a vessel processing machine comprising:

a) a drive for connection to a prime mover and rotation about a drive axis;

b) a split star wheel assembly removably connected to the drive;

c) the assembly including a plurality of subassemblies and releasable means releasably securing the subassemblies together;

d) releasable structure interposed between the assembly and the drive and forming the releasable connection between the assembly and the drive;

e) the drive including an overrunning clutch for normally transferring rotational driving forces from the drive to the assembly and allowing continued drive rotation without transferring such forces upon the assembly encountering resistance to rotation exceeding a maximum torque transfer capability of the clutch;

f) the clutch comprising:

i) a pair of rotatable drive elements rotatable about said axis;

ii) biasing means biasing the elements axially toward one another;

iii) a plurality of balls interposed between the elements;

iv) the elements having paired coacting recesses there being a like member of recess pairs and balls and each of the balls being associated with a different one of the pairs;

v) each ball being partially disposed in each of the recesses of that ball's associated recess pair during normal operation; and, vi) the pairs being irregularly spaced such that there is only one relative orientation in 360° of relative element rotation in which each ball engages its associated recess pair normally preventing element relative rotation;

g) whereby when the assembly encounters resistance exceeding such maximum torque the balls roll out of their associated recess pairs shifting the elements relatively axially to enable relative element rotation while the assembly remains substantially stationary.

2. In combination with a machine having at least one work station for processing vessels and input and output transfer stations, a vessel transport and transfer system comprising:

a) input and output star wheel mechanisms respectively positioned at the input and output stations;

b) a supply conveyor for transporting vessels to the input star wheel assembly;

c) a variable pitch feed screw connected to the conveyor adjacent one side of the input mechanism for spacing transported bottles for successive registration with the input star wheel;

d) a pair of spring biased input guide rails connected to the conveyor adjacent another side of the conveyor, the guide rails and feed screw delineating opposite sides of a vessel path of travel;

e) the input guide rails each having a guide position at a first distance from the feed screw and a jam relief position spaced further from the feed screw than the first distance;

f) an exit conveyor delineating an exit path of vessel travel downstream from the output star wheel mechanism;

g) an exit guide rail having an input end pivotally mounted at a location near the output star wheel mechanism;

h) the exit guide rail having a normal position adjacent the exit path, the exit guide rail being pivotal about its pivot mounting from its normal position to a jam relief position;

i) each star wheel mechanism including a star wheel and a drive normally drivingly connected to the star wheel to cause star wheel rotation and a disabling means for disabling the driving connection under overload conditions; and, j) each star wheel mechanism each further comprising:
 i) a split star wheel assembly removably connected to the drive;
 ii) the assembly including a plurality of sections and releasable means releasably securing the sections together; and,
 iii) releasable structure interposed between the assembly and the drive and forming the releasable connection between the assembly and the drive.

3. In combination with a machine having at least one work station for processing vessels and input and output transfer stations, a vessel transport and transfer system comprising:

a) input and output star wheel mechanisms respectively positioned at the input and output stations;

b) a supply conveyor for transporting vessels to the input star wheel assembly;

c) a variable pitch feed screw connected to the conveyor adjacent one side of the input mechanism for spacing transported bottles for successive registration with the input star wheel;

d) a pair of spring biased input guide rails connected to the conveyor adjacent another side of the conveyor, the guide rails and feed screw delineating opposite sides of a vessel path of travel;

e) the input guide rails each having a guide position at a first distance from the feed screw and a jam relief position spaced further from the feed screw than the first distance;

f) an exit conveyor delineating an exit path of vessel travel downstream from the output star wheel mechanism;

g) an exit guide rail having an input end pivotally mounted at a location near the output star wheel mechanism;

h) the exit guide rail having a normal position adjacent the exit path, the exit guide rail being pivotal about its pivot mounting from its normal position to a jam relief position;

i) each star wheel mechanism including a star wheel and a drive normally drivingly connected to the star wheel to cause star wheel rotation and a disabling means for disabling the driving connection under overload conditions;

j) each disabling means being an overrunning clutch for normally transferring rotational driving forces from the drive to the star wheel and allowing continued rotation of the drive without transferring such forces to the star wheel assembly upon the assembly encountering resistance to rotation exceeding a maximum torque transfer capability of the clutch; and, k) each of said clutches comprising:
 i) a pair of rotatable drive elements rotatable about a drive axis;
 ii) biasing means biasing the elements axially toward one another;
 iii) a plurality of balls interposed between the elements;
 iv) the elements having paired coacting recesses there being a like member of recess pairs and balls and each of the balls being associated with a different one of the pairs;
 v) each ball being partially disposed in each of the recesses of that ball's associated recess pair during normal operation; and,
 vi) the pairs being irregularly spaced such that there is only one relative orientation in 360° of relative element rotation in which each ball engages its associated recess pair normally preventing element relative rotation; and,
 vii) whereby when the star wheel encounters resistance exceeding such maximum torque the balls roll out of their associated recess pairs shifting the elements relatively axially to enable relative element rotation while the star wheel remains substantially stationary.

* * * * *